(12) United States Patent
Stratemeier et al.

(10) Patent No.: US 10,329,034 B2
(45) Date of Patent: Jun. 25, 2019

(54) EFFICIENT ORBITAL STORAGE AND DEPLOYMENT FOR SPACECRAFT IN INCLINED GEOSYNCHRONOUS ORBIT

(71) Applicant: Space Systems/Loral, LLC, Palo Alto, CA (US)

(72) Inventors: Darren R. Stratemeier, Mountain View, CA (US); Andrew E. Turner, Mountain View, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 298 days.

(21) Appl. No.: 15/441,040

(22) Filed: Feb. 23, 2017

(65) Prior Publication Data

US 2017/0247125 A1    Aug. 31, 2017

Related U.S. Application Data

(60) Provisional application No. 62/300,667, filed on Feb. 26, 2016, provisional application No. 62/300,682, (Continued)

(51) Int. Cl.
*B64G 1/10* (2006.01)
*B64G 1/24* (2006.01)
(Continued)

(52) U.S. Cl.
CPC .............. *B64G 1/242* (2013.01); *B64G 1/007* (2013.01); *B64G 1/1007* (2013.01); (Continued)

(58) Field of Classification Search
CPC ...... B64G 1/007; B64G 1/242; B64G 1/1007; B64G 1/1085
See application file for complete search history.

(56) References Cited

U.S. PATENT DOCUMENTS 3,836,969 A      9/1974  Bond et al.
3,995,801 A  *  12/1976  Bond .................. B64G 1/1085
                                                        244/158.4
(Continued)

FOREIGN PATENT DOCUMENTS

EP      0 575 678 A1     9/1992
GB      2 288 038 A     10/1995
(Continued)

OTHER PUBLICATIONS

Shan, J. et al., "Optimization of Injection Parameters for Slightly Inclined Geosynchronous Orbits"; 54th AIAA Aerospace Sciences Meeting, AIAA SciTech, (AIAA 2016-0217).
(Continued)

*Primary Examiner* — Richard G Davis
(74) *Attorney, Agent, or Firm* — Weaver Austin Villeneuve & Sampson LLP (57) ABSTRACT

A constellation of Earth-orbiting spacecraft includes a first spacecraft disposed in a first orbit, a second spacecraft disposed in a second orbit, and a third spacecraft disposed in a third orbit. Each of the first orbit, the second orbit and the third orbit is substantially circular with a radius of approximately 42,164 km, and has a specified inclination with respect to the equator within a range of 5° to 20°. The first orbit has a first right ascension of ascending node RAAN1, the second orbit has a second RAAN (RAAN2) approximately equal to RAAN1+120°, and the third orbit has a third RAAN (RAAN3) approximately equal to RAAN1+240°. A fourth spacecraft is disposed in a fourth orbit that has a period of approximately one sidereal day, an inclination of less than 2°, a perigee altitude of at least 8000 km, and an eccentricity between approximately 0.4 and 0.66.

20 Claims, 9 Drawing Sheets

Related U.S. Application Data filed on Feb. 26, 2016, provisional application No. 62/300,685, filed on Feb. 26, 2016.

(51) Int. Cl.
 *B64G 1/00* (2006.01)
 *B64G 1/40* (2006.01)

(52) U.S. Cl.
 CPC .............. *B64G 1/1085* (2013.01); *B64G 1/40* (2013.01); *B64G 1/405* (2013.01)

(56) References Cited

U.S. PATENT DOCUMENTS

| | | | |
|---|---|---|---|
| 4,502,051 A * | 2/1985 | Dondl | B64G 1/1007 342/356 |
| 4,809,935 A | 3/1989 | Draim | |
| 5,120,007 A * | 6/1992 | Pocha | B64G 1/1085 244/158.4 |
| 5,619,211 A | 4/1997 | Horkin et al. | |
| 5,813,634 A * | 9/1998 | Pizzicaroli | B64G 1/1085 244/158.4 |
| 6,305,646 B1 | 10/2001 | McAllister et al. | |
| 6,389,336 B2 | 5/2002 | Cellier | |
| 7,255,308 B1 | 8/2007 | Murphy | |
| 7,720,604 B1 * | 5/2010 | Cichan | G05D 1/0883 244/158.4 |
| 8,016,240 B2 | 9/2011 | Caplin et al. | |
| 2001/0041950 A1 | 11/2001 | Cellier | |
| 2004/0056146 A1 * | 3/2004 | Goodzeit | B64G 1/1085 244/10 |
| 2006/0240767 A1 | 10/2006 | Jacomb-Hood et al. | |
| 2008/0027595 A1 * | 1/2008 | Fowler | B64G 1/1085 701/13 |
| 2008/0307466 A1 | 12/2008 | Wang | |
| 2013/0002484 A1 | 1/2013 | Katz | |
| 2014/0017992 A1 | 1/2014 | Bigras et al. | |
| 2014/0339368 A1 | 11/2014 | Majer | |
| 2015/0158602 A1 | 6/2015 | Marshack et al. | |
| 2015/0158603 A1 | 6/2015 | Marshack et al. | |
| 2015/0197350 A1 | 7/2015 | Ho | |
| 2015/0268349 A1 | 9/2015 | Veysoglu et al. | |

FOREIGN PATENT DOCUMENTS

| | | |
|---|---|---|
| WO | 0 836 290 A2 | 4/1998 |
| WO | WO 2008/013592 A2 | 1/2008 |
| WO | WO 2009/013404 A2 | 1/2009 |

OTHER PUBLICATIONS

Jiancheng, L., "Separation of Geostationary Satellites With Eccentricity and Inclination Vector," 2009 International Conference on Measuring Technology and Mechatronics Automation, IEEE, 2009, 855-858.

International Search Report and Written Opinion dated Jun. 22, 2017 issued in PCT/US2017/019437.

International Search Report and Written Opinion dated Jun. 21, 2017 issued in PCT/US2017/019515.

International Search Report and Written Opinion dated Jun. 7, 2017 issued in PCT/US2017/019475.

Kechichian J A: "Orbit Plane Control Strategies for Inclined Geosynchronous Satellite Constellation", Journal of Spacecraft and Rockets, American Institute of Aeronautics and Astronautics,Reaston,VA, US, val. 35, No. 1, Jan. 1, 1998 (Jan. 1, 1998 ), pp. 46-54, XP000741314, ISSN: 0022-4650.

* cited by examiner

Orbit Orientation is given by the Euler Angles:
Inclination, $i$
Right Ascension of the Ascending Node, $\Omega$
Argument of Perigee, $\omega$ Right Ascension of the Ascending Node, ("RAAN" or "$\Omega$") Ranges from 0° TO 360°, Measured Eastward around the Plane of the Equator

Detail A

Detail B

Detail C

Detail D

EFFICIENT ORBITAL STORAGE AND DEPLOYMENT FOR SPACECRAFT IN INCLINED GEOSYNCHRONOUS ORBIT

CROSS-REFERENCE TO RELATED APPLICATIONS

This disclosure claims priority to U.S. Provisional Patent Application No. 62/300,667, filed Feb. 26, 2016, entitled "CONSTELLATION OF TWO SPACECRAFT IN INCLINED GEOSYNCHRONOUS ORBIT," to U.S. Provisional Patent Application No. 62/300,682, filed Feb. 26, 2016, entitled "STATIONKEEPING TECHNIQUES FOR SPACECRAFT IN INCLINED GEOSYNCHRONOUS ORBIT," and to U.S. Provisional Patent Application No. 62/300,685, filed Feb. 26, 2016, entitled "EFFICIENT ORBITAL STORAGE AND DEPLOYMENT FOR SPACECRAFT IN INCLINED GEOSYNCHRONOUS ORBIT" each assigned to the assignee hereof, the disclosures of which are hereby incorporated by reference in their entirety into this Patent Application for all purposes.

TECHNICAL FIELD

This invention relates generally to communications satellites, and more particularly to improved techniques for providing spare on-orbit spacecraft capable of replacing, when desired, any of a number of spacecraft disposed in a constellation of spacecraft arranged in moderately inclined orbits.

BACKGROUND

The present applicant manufactures and deploys spacecraft for, inter alia, communications, broadcast services and/or imaging services. Many satellite services are provided from spacecraft in geosynchronous equatorial orbit (GEO), a circular, equatorial orbit having a radius of 42,164 kilometers and an orbital period of one sidereal day of (23 hr 56 min. 4 seconds, the period of rotation of Earth in inertial space). A satellite in GEO appears stationary to a ground station on the Earth and can provide coverage to a significant portion of the globe at latitudes (the "GEO coverage latitudes") between about 70° N and 70° S. Because longitudes ("slots") at which spacecraft may be stationed in GEO (i.e., available locations on the GEO "arc") are limited, it is desirable to find techniques for providing a service coverage region size similar to existing geostationary spacecraft by disposing spacecraft in moderately inclined, circular, geosynchronous orbits (i.e., an orbit having a radius of 42,164 kilometers and an inclination to the equator within the range of about 10° to about 20°).

The present applicant has developed improved techniques for deploying and operating a constellation of spacecraft arranged in moderately inclined orbits. For example, in a related patent application, filed concurrently herewith and entitled "Inclined Geosynchronous Orbit Spacecraft Constellations", owned by the assignee of the present application, techniques are described for providing uninterrupted coverage to a substantial portion of GEO coverage latitudes from a moderately inclined geosynchronous orbit using a constellation consisting of as few as two spacecraft has been described. As a further example, in a related patent application, filed concurrently herewith and entitled "Stationkeeping Techniques for Spacecraft in Inclined Geosynchronous Orbit", owned by the assignee of the present application, techniques are described for stationkeeping of satellites disposed in moderately inclined geosynchronous orbits. The disclosures of the above mentioned patent applications are hereby incorporated in their entirety into the present application for all purposes.

SUMMARY

The presently disclosed techniques relate to improved techniques for providing spare on-orbit spacecraft capable of replacing, when desired, any of a number of spacecraft disposed in a constellation of spacecraft arranged in moderately inclined orbits.

According to some implementations, a constellation of Earth-orbiting spacecraft includes a first spacecraft disposed in a first orbit, a second spacecraft disposed in a second orbit, and a third spacecraft disposed in a third orbit. Each of the first orbit, the second orbit and the third orbit is substantially circular with a radius of approximately 42,164 km, and has a specified inclination with respect to the equator within a range of 5° to 20°. The first orbit has a first right ascension of ascending node RAAN1, the second orbit has a second RAAN (RAAN2) approximately equal to RAAN1+120°, and the third orbit has a third RAAN (RAAN3) approximately equal to RAAN1+240°. a fourth spacecraft is disposed in a fourth orbit, the fourth orbit having a period of approximately one sidereal day, an inclination of less than 2°, a perigee altitude of at least 8000 km, and an eccentricity within a range of 0.4 to 0.66.

In some examples, the fourth spacecraft may be configured to perform an orbit transfer maneuver from the fourth orbit to any of the first orbit, the second orbit and the third orbit, the orbit transfer maneuver requiring a velocity increment ($\Delta V$) not greater than 1700 m/s. In some examples, at least one electric thruster onboard the fourth spacecraft may be configured to provide the velocity increment.

In some examples, each of the first spacecraft, the second spacecraft and the third spacecraft may be disposed proximate to a first common longitudinal station.

In some examples, the constellation may further include a fifth spacecraft and a sixth spacecraft disposed in the first orbit, a seventh spacecraft and a eighth spacecraft disposed in the second orbit, and a ninth spacecraft and a tenth spacecraft disposed in the third orbit. In some examples, each of the first spacecraft, the second spacecraft and the third spacecraft may be disposed proximate to a first common longitudinal station. Each of the fifth spacecraft, the seventh spacecraft and the ninth spacecraft may be disposed at a second common longitudinal station, different from the first common longitudinal station. Each of the sixth spacecraft, the eighth spacecraft and the tenth spacecraft may be disposed at a third common longitudinal station, different from the first common longitudinal station and the second common longitudinal station. In some examples, an apogee of the fourth orbit may be approximately aligned with one of the first common longitudinal station, the second common longitudinal station and the third common longitudinal station.

In some examples, the fourth orbit may have an initially established line of apses such that apogee is aligned in the direction of the vernal equinox.

According to some implementations, a constellation of Earth-orbiting spacecraft includes a first spacecraft disposed in a first orbit, and a second spacecraft disposed in a second orbit. Each of the first orbit and the second orbit is substantially circular with a radius of approximately 42,164 km, and has a specified inclination with respect to the equator within a range of 5° to 20°. The first orbit has a first right ascension of ascending node RAAN1 and the second orbit has a second RAAN (RAAN2) approximately equal to RAAN1+90°. A third spacecraft is disposed in a third orbit, the third orbit having a period of approximately one sidereal day, an inclination less than 2°, a perigee altitude of at least 8000 km, and an eccentricity within a range of 0.4 to 0.66.

In some examples, the third spacecraft may be configured to perform an orbit transfer maneuver from the third orbit to either of the first orbit and the second orbit, the orbit transfer maneuver requiring a velocity increment (ΔV) not greater than 1700 m/s. In some examples, at least one electric thruster onboard the third spacecraft may be configured to provide the velocity increment.

In some examples, each of the first spacecraft, the second spacecraft and the third spacecraft may be disposed proximate to a first common longitudinal station.

In some examples, the third orbit may have an initially established line of apses such that apogee is aligned in the direction of the vernal equinox.

According to some implementations, a method includes executing a spare provisioning strategy for a constellation of Earth-orbiting spacecraft. The constellation includes two or more spacecraft, including a first spacecraft disposed in a first operational orbit and a second spacecraft disposed in a second operational orbit. Each of the first orbit and the second orbit is substantially circular with a radius of approximately 42,164 km. The first orbit has a first specified inclination with respect to the equator and the second orbit has a second specified inclination with respect to the equator, the first specified inclination and the second specified inclination each being within a range of 5° to 20°. The spare provisioning strategy includes disposing a spare spacecraft in a storage orbit, the storage orbit having a period of approximately one sidereal day, an inclination of less than 2°, a perigee altitude of at least 8000 km, and an eccentricity within a range of 0.4 to 0.66.

In some examples, the spare provisioning strategy may further include transferring the spare spacecraft from the storage orbit to one of the first operational orbit and the second operational orbit. In some examples, transferring the spare spacecraft from the storage orbit to one of the first orbit and the second orbit may include providing a velocity increment (ΔV) not greater than 1700 m/s.

In some examples, the constellation may include three or more spacecraft, including the first spacecraft disposed in the first operational orbit, the second spacecraft disposed in the second operational orbit, and a third spacecraft disposed in a third operational orbit. In some examples, the spare provisioning strategy may further include transferring the spare spacecraft from the storage orbit to one of the first orbit, the second orbit and the third orbit. In some examples, transferring the spare spacecraft from the storage orbit to one of the first orbit, the second orbit and the third orbit may include providing a velocity increment (ΔV) not greater than 1700 m/s.

In some examples, the storage orbit may have an initially established line of apses such that apogee is aligned in the direction of the vernal equinox.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Figure 1:
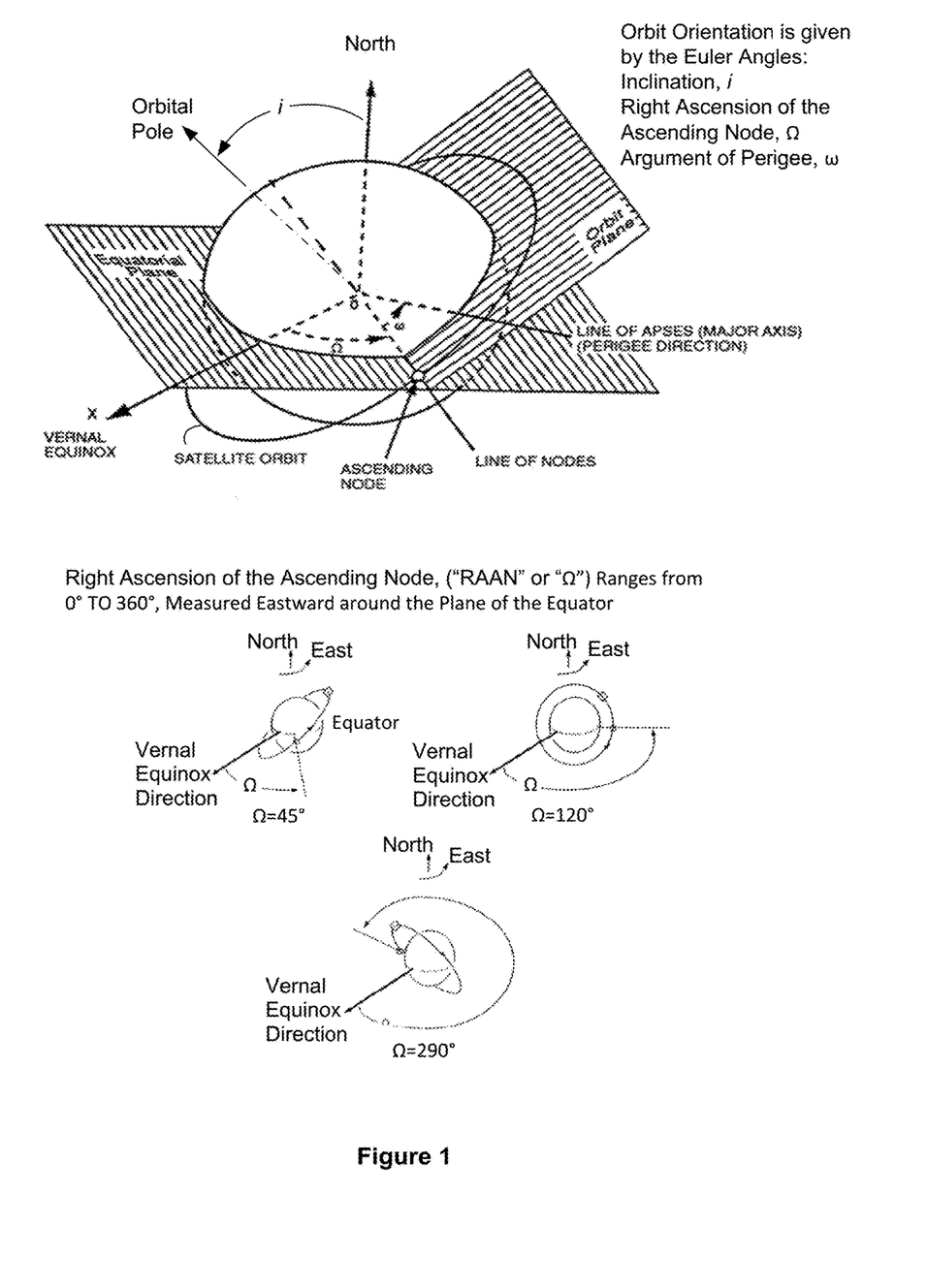
FIG. 1 illustrates characteristics of inclined orbits.

The present disclosure relates to a constellation of satellites disposed in moderately inclined, circular, geosynchronous orbits. Referring now to FIG. 1, each orbit is contained in a respective orbit plane that crosses the plane of the equator at respective nodes (i.e., an ascending node and a descending node (not illustrated) 180° from the ascending node. Each respective orbit plane will have a characteristic angle (Ω) of right ascension of the ascending node (RAAN), and inclination (i) as defined in FIG. 1.

Figure 2:
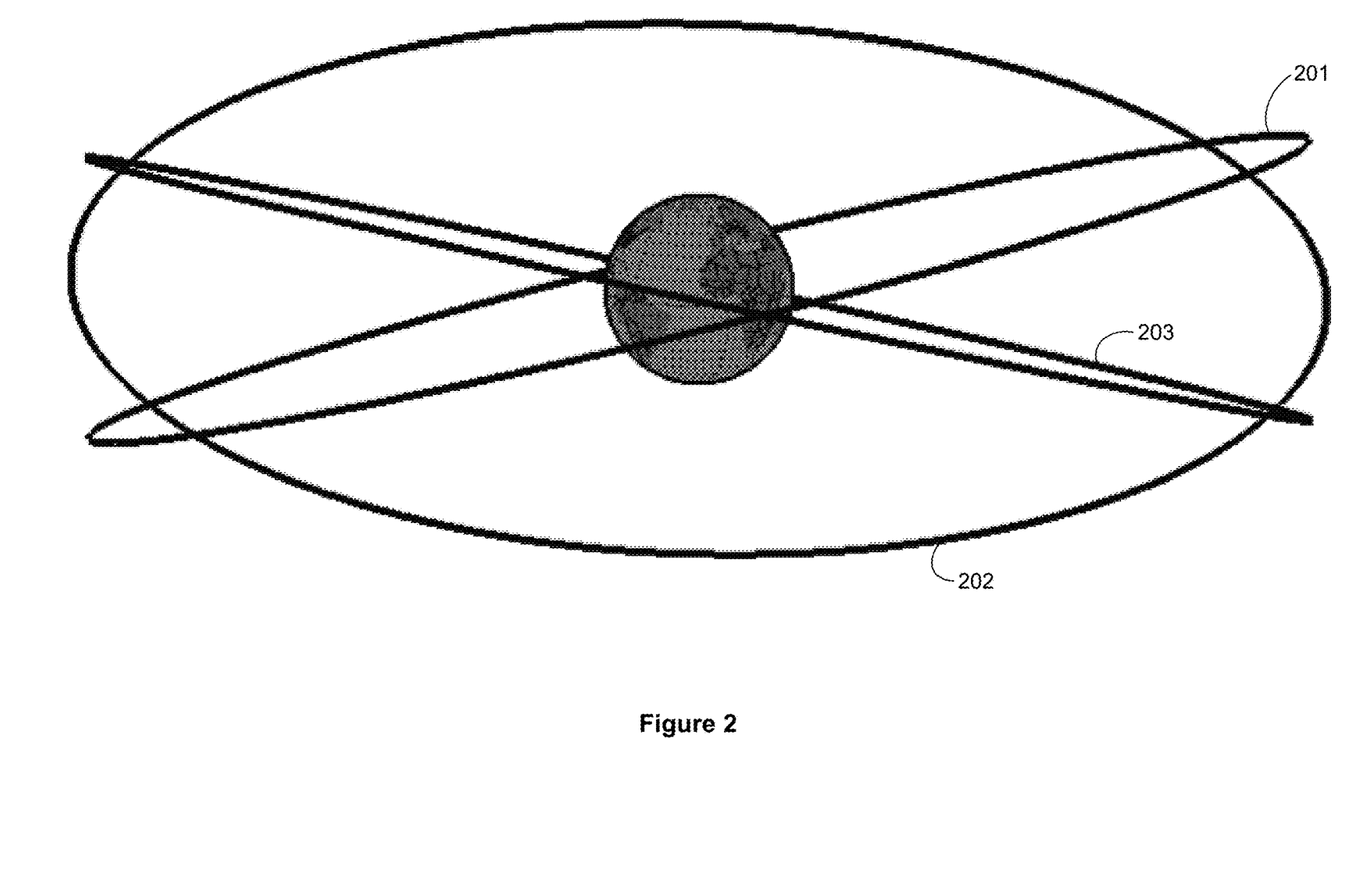
FIG. 2 illustrates a deep space view of orbit tracks of three inclined orbits.

In some implementations, the constellation may include spacecraft disposed in three distinct orbit planes having three equally separated RAAN values (i.e., 120° apart). FIG. 2 illustrates a deep space view of tracks of three orbits, orbit 201, orbit 202 and orbit 203. Each orbit track is disposed in a respective orbit plane, the RAAN's of the three orbit planes being separated by 120°. From the perspective illustrated in FIG. 2, the orbit tracks appear as ellipses, however it should be understood that each orbit track, if viewed in a direction orthogonal to its respective orbit plane, would appear circular.

Figure 3:
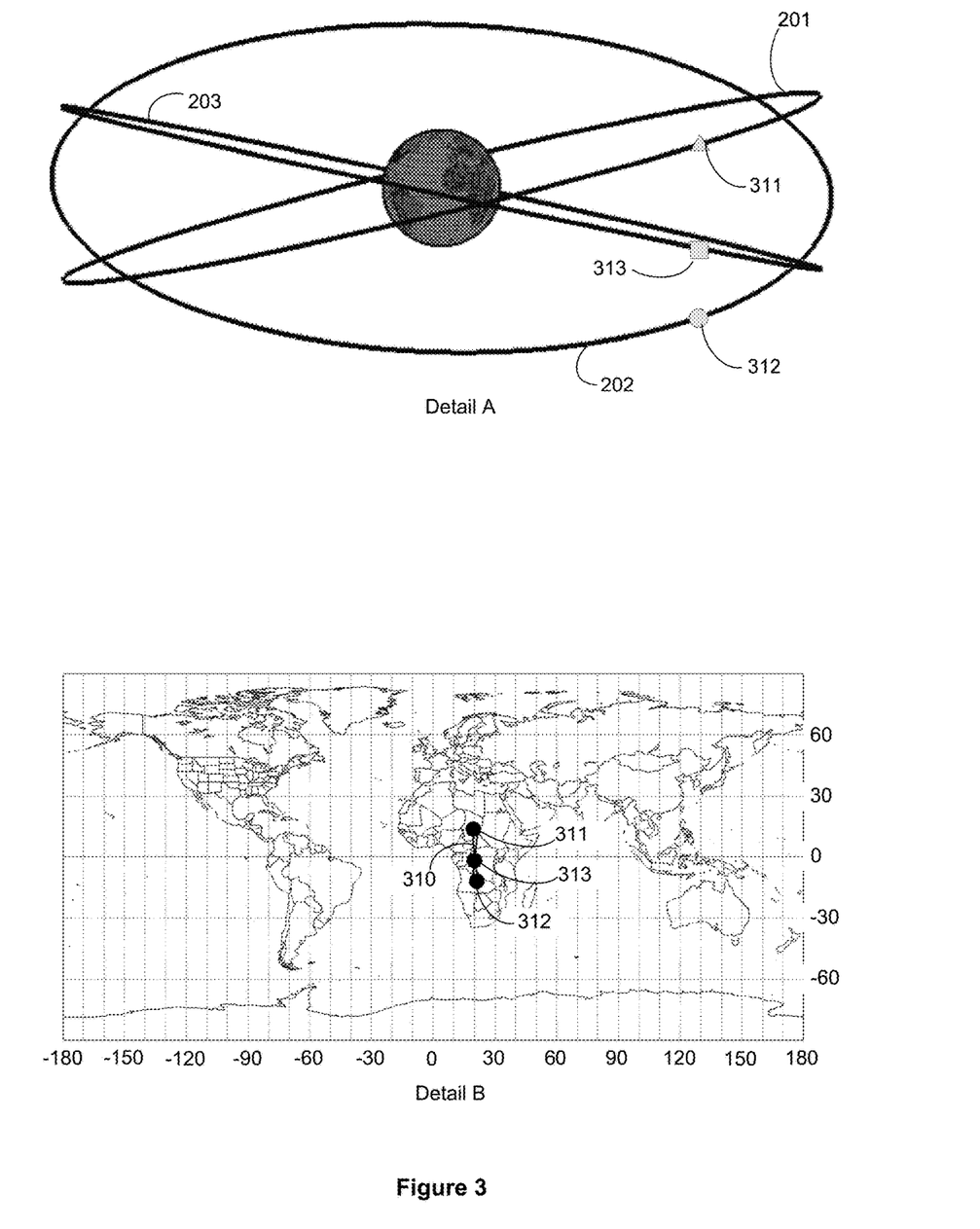
FIG. 3 illustrates orbit tracks and ground tracks of spacecraft disposed in the three inclined orbits.

Each orbit may include one or more spacecraft disposed at a respective longitudinal location ("station"). In an example implementation illustrated in FIG. 3, a single spacecraft is disposed in each orbit. More particularly, referring to Detail A of FIG. 3, a spacecraft 311 is disposed in orbit 201, a spacecraft 312 is disposed in orbit 202, and a spacecraft 313 is disposed in orbit 203. As may be more clearly observed in Detail B, each of the spacecraft 311, the spacecraft 312 and the spacecraft 313 may be stationed at a common nominal longitude. In the illustrated example, the nominal longitude is approximately 20° East longitude. Although non-stationary, the spacecraft will exhibit limited apparent motion with respect to a ground station. More particularly, each spacecraft will exhibit an apparent motion with respect to the ground along the ground track 310. Spacecraft in such an orbit will cross the plane of the equator twice per day and an operator of such spacecraft must avoid transmissions between the spacecraft and the ground at time proximate to those crossings, so as to avoid RF interference with spacecraft located on the GEO arc. Thus, the constellation may be configured such that each spacecraft transmits and receives only when sufficiently north or south of the equator to avoid such RF interference. The constellation may be configured such that each respective spacecraft transmits and/or receives RF signals only during periods of time when it is at a latitude with magnitude greater than the magnitude of a "safe" latitude. The safe latitude magnitude may be selected such that transmission and reception of RF signals above that latitude does not interfere with GEO spacecraft, and so that there is never a time when less than two of the three spacecraft are at latitudes with magnitudes greater than the safe latitude magnitude. At the epoch illustrated in Detail B for example, the spacecraft 311 is at a latitude north of the safe latitude in the northern hemisphere and the spacecraft 312 is south of the safe latitude in the southern hemisphere. As a result, the constellation may be configured to avoid interference with GEO spacecraft, while still providing, in the absence of a failure of any of the three spacecraft, uninterrupted service to a coverage region that is substantially coextensive with what would be provided by a spacecraft in a conventional geostationary orbit.

In another implementation (not illustrated) described in the patent application entitled "Inclined Geosynchronous Orbit Spacecraft Constellations", the constellation includes two spacecraft, each disposed in a respective, substantially circular, moderately inclined geosynchronous orbit. Each orbit may have an inclination with respect to the equator of at least 5°. Each orbit has a respective RAAN that, advantageously, may be separated by 90°. For such a two spacecraft constellation, where each orbit has an inclination with respect to the equator of approximately 15°, coverage extends over a range of latitude on the order of 55° S to 55° N. This is because there will be a minimum of one spacecraft outside of the equatorial zone or in a safe latitude at any time, instead of two in the 3-spacecraft constellation. The spacecraft at a safe latitude may be in the northern hemisphere so coverage will only extend to 55° S or the spacecraft may be in the southern hemisphere and coverage will only extend to 55° N.

One aspect of the presently disclosed techniques relates to providing a single backup or spare spacecraft for the above described constellations that include a number of "primary" spacecraft. For example, referring again to FIG. 3, the primary spacecraft may be regarded as including the spacecraft 311, the spacecraft 312, and the spacecraft 313. To minimize service interruptions, the single spare spacecraft, which may be required to replace any one of the three primary spacecraft, is stored on orbit. In the absence of the presently disclosed techniques, the spare spacecraft may be disposed in a selected one of the three operational orbits: orbit 201, orbit 202 or orbit 203. In such an approach, if the primary spacecraft to be replaced happens to be in the selected one of the three operational orbits, then the velocity increment ($\Delta V$) required to replace the primary spacecraft may be negligibly small. However, in the event the primary spacecraft to be replaced is in one of the two other operational orbits, the $\Delta V$ required to rotate the RAAN of the spare spacecraft's orbit to match the RAAN of the orbit of the spacecraft to be replaced is on the order of 2100 m/sec.

Figure 4:
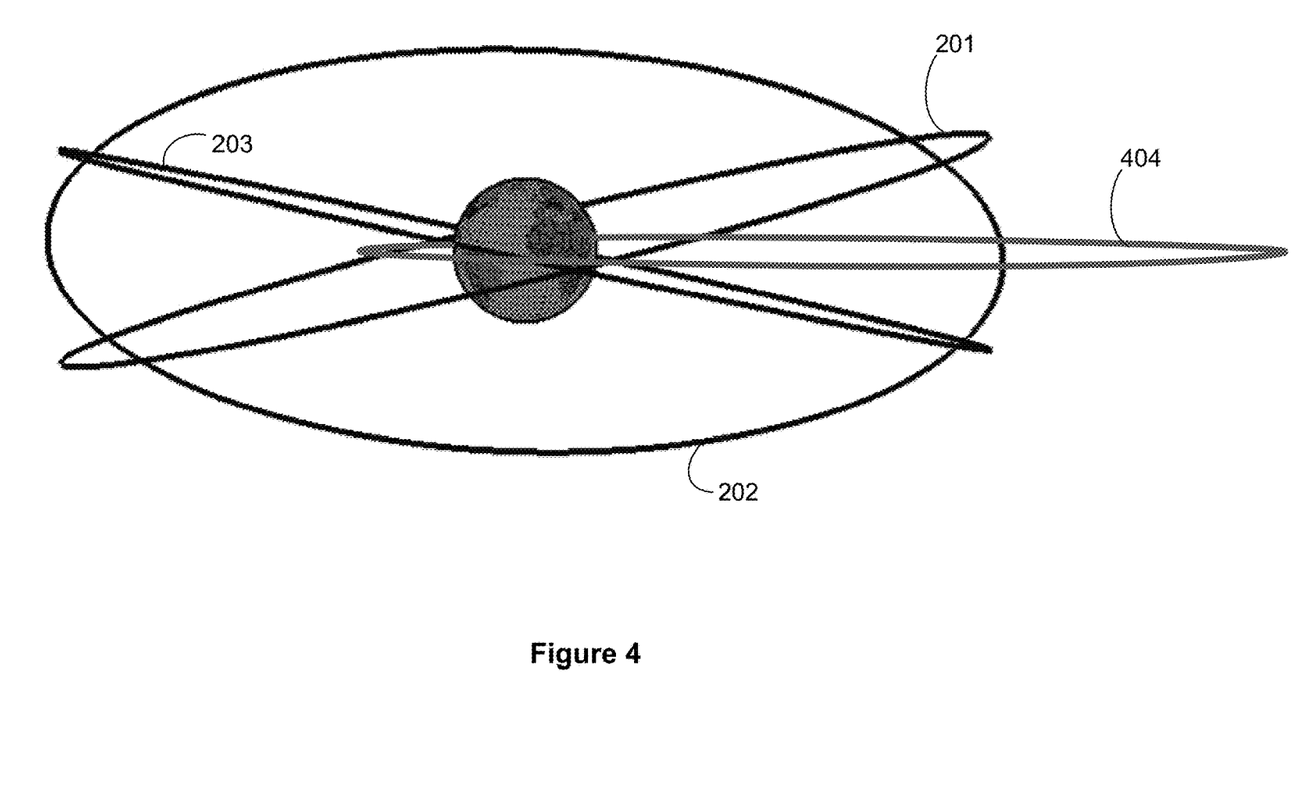
FIG. 4 illustrates an example of a storage orbit together with operational orbits, according to an implementation.

The present inventors have appreciated that the spare spacecraft may advantageously be disposed in a "storage" orbit that is substantially different from any of the operational orbits. By judicious selection of parameters of the storage orbit, a spare spacecraft may be transferred to any of the three operational orbits at a $\Delta V$ cost substantially less than the above-mentioned 2100 m/s. In an implementation, the storage orbit has an orbital period of one sidereal day (i.e., the storage orbit is geosynchronous), an inclination of less than 2°, an eccentricity within the range of 0.4 to 0.66 and a perigee altitude of at least 8000 km. FIG. 4 illustrates an example of a storage orbit 404 as described above, together with operational orbits 201, 202 and 203. In an implementation, the storage orbit may be substantially equatorial, i.e. have an inclination that is approximately zero.

Figure 5:
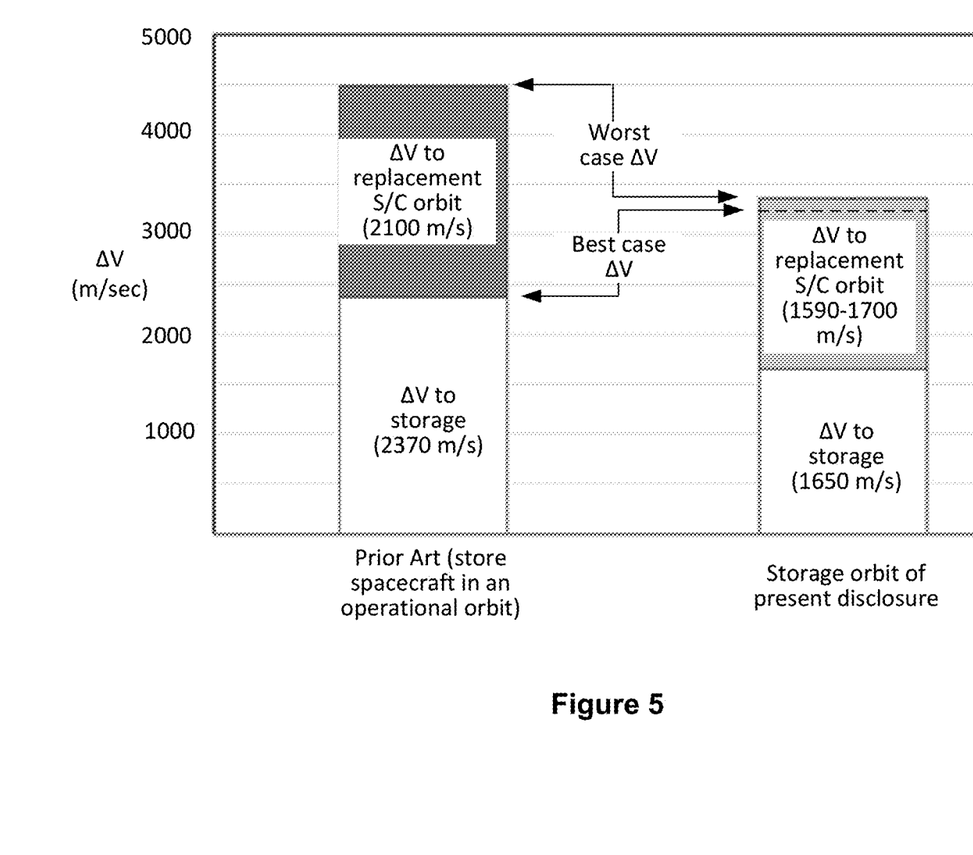
FIG. 5 illustrates, the ΔV required in accordance with the presently disclosed techniques in comparison with the prior art.

Features and benefits of the above identified storage orbit may be better appreciated by referring to FIG. 5, which illustrates, for a constellation including inclined operational orbits, the $\Delta V$ required in accordance with the presently disclosed techniques in comparison with the prior art in which the spare spacecraft is stored in an operational orbit. The illustrated comparison assumes an initial orbit, at the time of launch vehicle separation, having a perigee altitude of about 200 km, an apogee altitude of about 31,000 km, and an inclination of about 27°. The comparison also assumes that orbit transfer maneuvers are performed using a low thrust, high specific impulse (Isp) electric thruster. As used herein, and in the claims, an electric thruster is a thruster that converts electrical energy to propellant kinetic energy substantially without regard to any chemical energy the propellant may possess. For example, an electric thruster may operate by ionizing and accelerating a gaseous propellant, where the propellant is a noble gas of a heavy element, such as xenon or argon. The term electric thruster, as used herein and in the claims, encompasses an electrostatic thruster, an electromagnetic thruster, a Hall Effect thruster, a wakefield accelerator, and a traveling wave accelerator, for example. An electric thruster may operate at an $I_{sp}$ of 1000-4000 seconds, but spacecraft power constraints, at least, practically constrain thrust levels to well less than one newton.

Parameters of the initial orbit used in the illustrated comparison correspond to a typical launch profile from Cape Canaveral (latitude 28.5°), but other launch sites and initial orbit parameters are within the contemplation of the present disclosure. The $\Delta V$ to transfer from the initial orbit to any of the operational orbits is about 2370 m/s. In accordance with prior art techniques, 2370 m/s is also the $\Delta V$ required to attain storage orbit because the spare spacecraft is assumed to be stored in one of the operational orbits. As noted above, if the primary spacecraft needing replacement happens to be in the same orbit as the spare spacecraft then the $\Delta V$ (the "best case $\Delta V$") required to replace that primary spacecraft is negligibly small. However, unless the constellation operator is willing to provide a spare spacecraft in each operational orbit plane, the spare spacecraft must be capable of transferring from its initial storage orbit (one of the operational orbits) to either of the other operational orbits. The $\Delta V$ required (the "worst case $\Delta V$") for such an orbit transfer has been found to be over 2100 m/s. Thus the spare spacecraft must be designed to accommodate a total orbit acquisition delta V of at least 4470 m/s.

In accordance with the storage orbit proposed by the present disclosure, however, where the storage orbit has an inclination of approximately 0°, an eccentricity of approximately 0.612, and a perigee altitude of approximately 10,000 km, the $\Delta V$ to transfer from the initial orbit to the storage orbit is about 1650 m/s. From the storage orbit, the present inventors have determined that the $\Delta V$ required to transfer to one of the operational orbits varies from 1590 m/s ("best case") to about 1700 m/s ("worst case"). Thus, the spare spacecraft must be designed to accommodate a total orbit acquisition delta V of only about 3350 m/s instead of 4470 m/s as indicated above. Accordingly, a reduction of about 25% in $\Delta V$ and an even larger reduction in propellant mass may be achieved using the storage orbit of the present disclosure. Furthermore, the worst case transfer time from storage to operational orbit, which may be assumed to be proportional to the ΔV required, is shortened by at least 20%.

Figure 6:
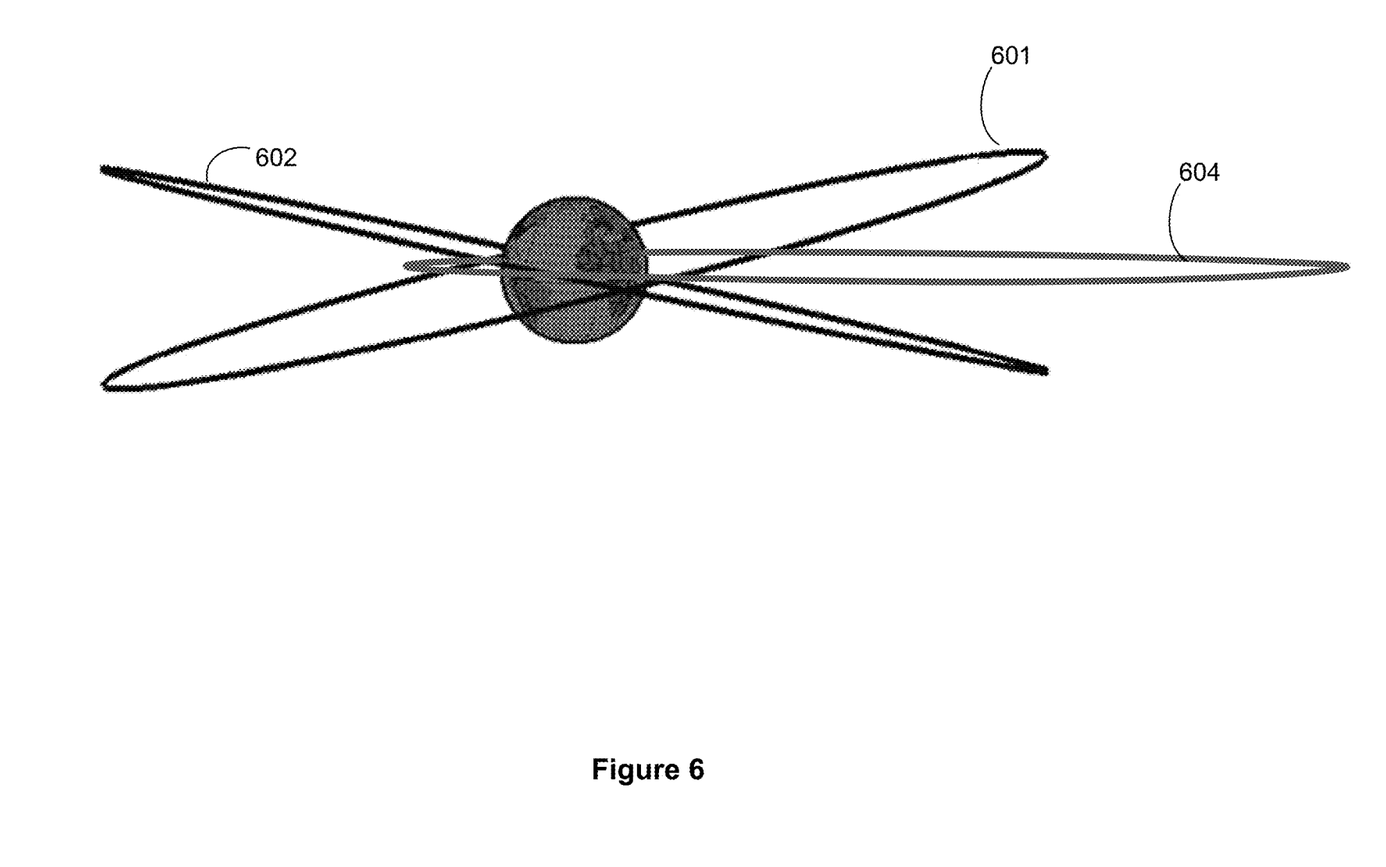
FIG. 6 illustrates an example of a storage orbit together with operational orbits, according to another implementation.

As described above, the storage orbit of the present disclosure enables a single spacecraft to efficiently serve as a spare for any of three primary spacecraft, each primary spacecraft being disposed in a different operational orbit. Similarly, as illustrated in FIG. 6, for a two satellite constellation, as described in the patent application entitled "Inclined Geosynchronous Orbit Spacecraft Constellations", the storage orbit 604 of the present disclosure enables a single spacecraft disposed therein to efficiently serve as a spare for a primary spacecraft disposed in either of operational orbit 601 or operational orbit 602.

In some constellations to which the presently disclosed techniques may be applied, two or more primary spacecraft may be disposed in each operational orbit. For example, referring now to FIG. 7, a system is illustrated in which each of three operational orbits has disposed therein three primary spacecraft. More particularly, referring to Detail C, primary spacecraft 311, 321, and 331 are disposed in operational orbit 201; primary spacecraft 312, 322, and 332 are disposed in operational orbit 202; and primary spacecraft 313, 323, and 333 are disposed in operational orbit 203.

Figure 7:
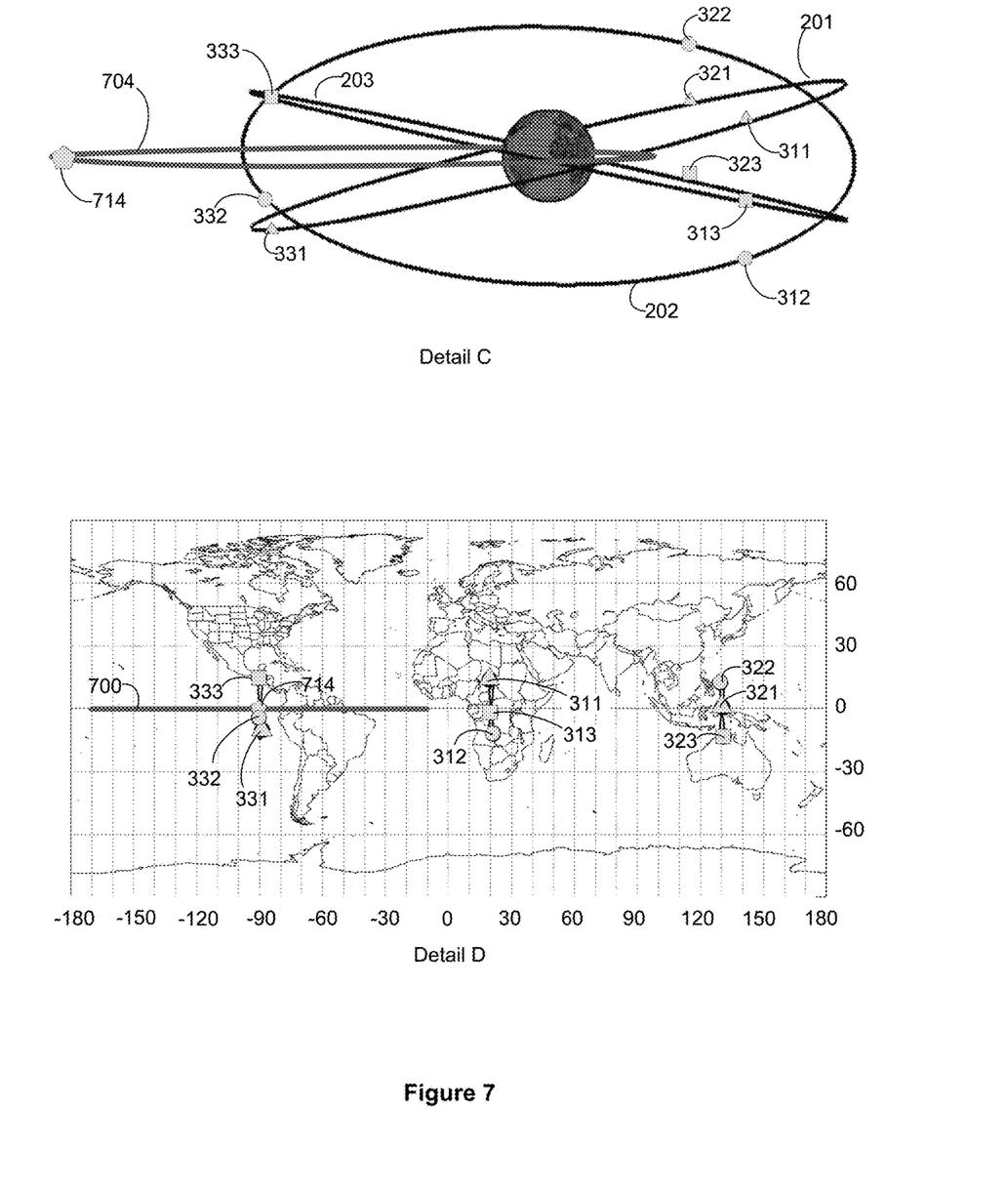
FIG. 7 illustrates orbit tracks and ground tracks of spacecraft disposed in three inclined operational orbits and one storage orbit

As may be more clearly observed in Detail D, each of spacecraft 311, spacecraft 312, and spacecraft 313 may be stationed at a first common nominal longitude; similarly, each of spacecraft 321, spacecraft 322, and spacecraft 323 may be stationed at a second, different common nominal longitude while each of spacecraft 331, spacecraft 332, and spacecraft 333 may be stationed at a third, different, common nominal longitude In the illustrated example, the first nominal longitude is approximately 20° East, the second nominal longitude is approximately 130° East, and the third nominal longitude is approximately 90° West. The illustrated constellation is capable of providing, in the absence of a failure of any of the nine spacecraft, continuous service to a coverage region that is substantially coextensive with what would be provided by a spacecraft in a conventional geostationary orbit.

Thus, another aspect of the presently disclosed techniques relates to disposing, in a storage orbit, a spare spacecraft for the above described constellation that includes nine "primary" spacecraft. As described above, a storage orbit 704, advantageously, has an orbital period of one sidereal day (i.e., is geosynchronous), an inclination of approximately 0°, and an eccentricity in the range of 0.4 to 0.66, and a perigee altitude of at least 8000 km. A spare spacecraft 714 may be disposed in storage orbit 704 and be available to replace, at need, any of the nine primary spacecraft. In the illustrated implementation, the storage orbit 704 is configured such that the orbit's apogee is approximately aligned with the third nominal longitude of approximately −90°. A corresponding ground track 700 of spacecraft 714 is, accordingly centered at 90° and spans approximately 160 degrees of longitude for the eccentricity 0.66 case and a lesser range for lower eccentricity.

Figure 8:
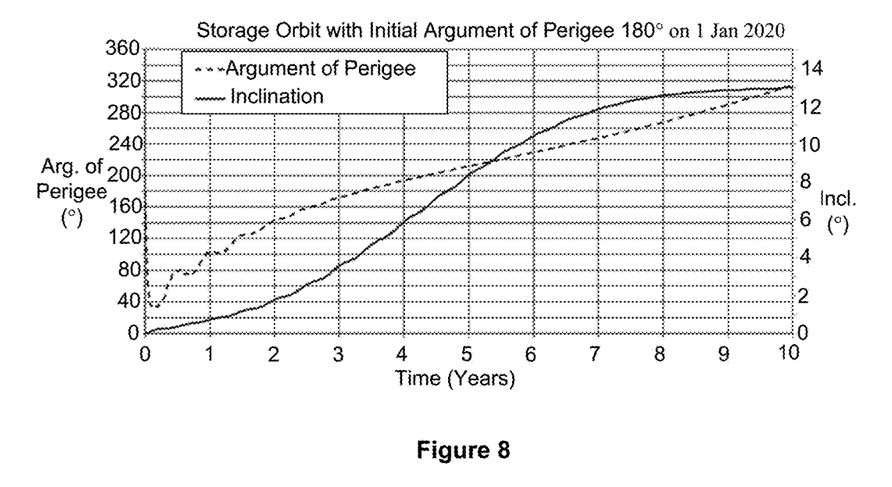
FIG. 8 illustrates an example plot of argument of perigee and inclination of the storage orbit as a function of time, according to an implementation.
Figure 9:
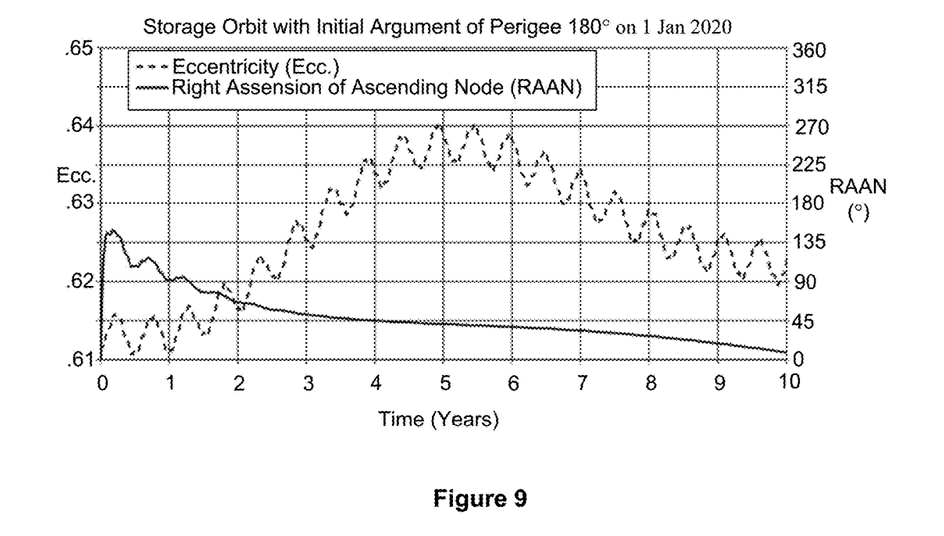
FIG. 9 illustrates an example plot of eccentricity and RAAN as a function of time, according to an implementation.

Additional characteristics of the storage orbit as a function of time are presented in FIGS. 8 and 9. FIG. 8 illustrates an example plot of argument of perigee and inclination of the storage orbit as a function of time. FIG. 9 illustrates an example plot of eccentricity and RAAN as a function of time. As indicated above, a spacecraft intended to be disposed in the storage orbit may undergo, following launch vehicle separation, an orbit transfer maneuver from an initial orbit achieved by the launch vehicle to the storage orbit. For example, the initial orbit may have a perigee altitude of 200 km, an apogee altitude of 31,000 km, and an inclination of 27°. Advantageously, the storage orbit may be established with each of an initial RAAN and an initial inclination being 0°, a perigee altitude being approximately 10,000 km, and an apogee altitude being approximately 62,000 km (eccentricity ≈0.6). Advantageously, the line of apses may be initially established such that apogee is aligned in the direction of the vernal equinox; as a result, natural drift in inclination of the storage orbit will occur relatively slowly, reaching 4° in approximately 3.3 years at which time the argument of perigee has drifted to 180°. Advantageously, inclination of the storage orbit may be reset to 0° at that time (not illustrated), requiring a ΔV of about 100 m/s.

As may be observed in FIG. 9, eccentricity is relatively stable so that perigee and apogee altitude variations are less than 3% and may require little or no correction. In an implementation, RAAN may be allowed to drift while the spacecraft is in the storage orbit because RAAN may be conveniently corrected at the time the spacecraft is transferred to an operational orbit.

Figure 10:
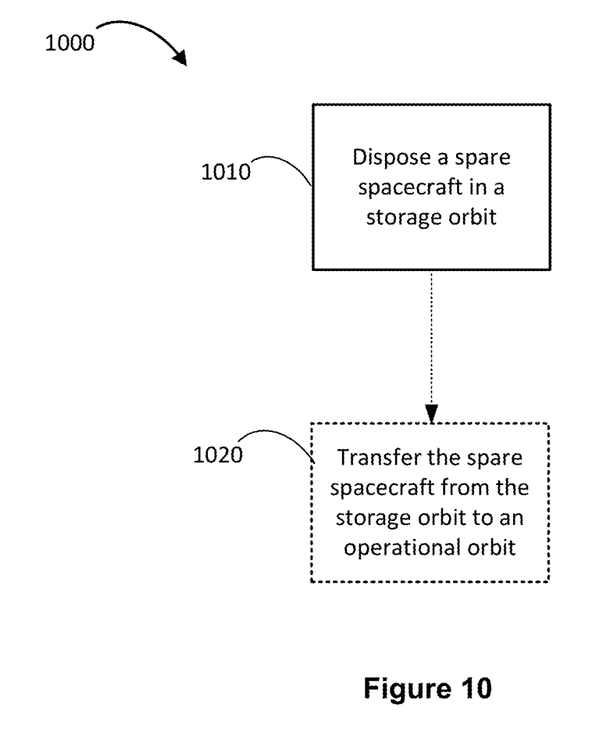
FIG. 10 illustrates a method of executing a spare provisioning strategy for a constellation of Earth-orbiting spacecraft, according to an implementation.

FIG. 10 illustrates a method 1000 of executing a spare provisioning strategy for a constellation of Earth-orbiting spacecraft. As described above, the constellation may include two or more spacecraft, including a first spacecraft disposed in a first operational orbit and a second spacecraft disposed in a second operational orbit. Each of the first orbit and the second orbit may be substantially circular with a radius of approximately 42,164 km. The first orbit may have a first specified inclination with respect to the equator and the second orbit may have a second specified inclination with respect to the equator, the first specified inclination and the second specified inclination each being within a range of 5° to 20°. A storage orbit, may have a period of approximately one sidereal day, an inclination of less than 2°, a perigee altitude of at least 8000 km, and an eccentricity within the range of 0.4 to 0.66.

The spare provisioning strategy may include disposing, at block 1010, a spare spacecraft in a storage orbit. Optionally, the method 1000 may include transferring, at block 1020, the spare spacecraft from the storage orbit to one of the first operational orbit and the second operational orbit.

Thus, improved techniques for providing spare on-orbit spacecraft capable of replacing, when desired, any of a number of spacecraft disposed in a constellation of spacecraft arranged in moderately inclined orbits have been described. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A constellation of Earth-orbiting spacecraft, the constellation comprising:
   a first spacecraft disposed in a first orbit, a second spacecraft disposed in a second orbit, and a third spacecraft disposed in a third orbit, wherein:
      each of the first orbit, the second orbit and the third orbit is substantially circular with a radius of approximately 42,164 km, and has a specified inclination with respect to the equator within a range of 5° to 20°;
      the first orbit has a first right ascension of ascending node RAAN1, the second orbit has a second RAAN (RAAN2) approximately equal to RAAN1+120°, and the third orbit has a third RAAN (RAAN3) approximately equal to RAAN1+240°; and a fourth spacecraft is disposed in a fourth orbit, the fourth orbit having a period of approximately one sidereal day, an inclination of less than 2°, a perigee altitude of at least 8000 km, and an eccentricity within a range of 0.4 to 0.66.

2. The constellation of claim 1, wherein the fourth spacecraft is configured to perform an orbit transfer maneuver from the fourth orbit to any of the first orbit, the second orbit and the third orbit, the orbit transfer maneuver requiring a velocity increment ($\Delta V$) not greater than 1700 m/s.

3. The constellation of claim 2, wherein at least one electric thruster onboard the fourth spacecraft is configured to provide the velocity increment.

4. The constellation of claim 1, wherein each of the first spacecraft, the second spacecraft and the third spacecraft is disposed proximate to a first common longitudinal station.

5. The constellation of claim 1, further comprising a fifth spacecraft and a sixth spacecraft disposed in the first orbit, a seventh spacecraft and a eighth spacecraft disposed in the second orbit, and a ninth spacecraft and a tenth spacecraft disposed in the third orbit.

6. The constellation of claim 5, wherein:
each of the first spacecraft, the second spacecraft and the third spacecraft is disposed proximate to a first common longitudinal station;
each of the fifth spacecraft, the seventh spacecraft and the ninth spacecraft is disposed at a second common longitudinal station, different from the first common longitudinal station; and
each of the sixth spacecraft, the eighth spacecraft and the tenth spacecraft is disposed at a third common longitudinal station, different from the first common longitudinal station and the second common longitudinal station.

7. The constellation of claim 6, wherein an apogee of the fourth orbit is approximately aligned with one of the first common longitudinal station, the second common longitudinal station and the third common longitudinal station.

8. The constellation of claim 1, wherein the fourth orbit has an initially established line of apses such that apogee is aligned in the direction of the vernal equinox.

9. A constellation of Earth-orbiting spacecraft, the constellation comprising:
a first spacecraft disposed in a first orbit, and a second spacecraft disposed in a second orbit, wherein:
each of the first orbit and the second orbit is substantially circular with a radius of approximately 42,164 km, and has a specified inclination with respect to the equator within a range of 5° to 20°;
the first orbit has a first right ascension of ascending node RAAN1 and the second orbit has a second RAAN (RAAN2) approximately equal to RAAN1+90°; and
a third spacecraft is disposed in a third orbit, the third orbit having a period of approximately one sidereal day, an inclination less than 2°, a perigee altitude of at least 8000 km, and an eccentricity within a range of 0.4 to 0.66.

10. The constellation of claim 9, wherein the third spacecraft is configured to perform an orbit transfer maneuver from the third orbit to either of the first orbit and the second orbit, the orbit transfer maneuver requiring a velocity increment ($\Delta V$) not greater than 1700 m/s.

11. The constellation of claim 10, wherein at least one electric thruster onboard the third spacecraft is configured to provide the velocity increment.

12. The constellation of claim 9, wherein each of the first spacecraft, the second spacecraft and the third spacecraft is disposed proximate to a first common longitudinal station.

13. The constellation of claim 9, wherein the third orbit has an initially established line of apses such that apogee is aligned in the direction of the vernal equinox.

14. A method comprising:
executing a spare provisioning strategy for a constellation of Earth-orbiting spacecraft, wherein:
the constellation includes two or more spacecraft, including a first spacecraft disposed in a first operational orbit and a second spacecraft disposed in a second operational orbit;
each of the first orbit and the second orbit is substantially circular with a radius of approximately 42,164 km;
the first orbit has a first specified inclination with respect to the equator and the second orbit has a second specified inclination with respect to the equator, the first specified inclination and the second specified inclination each being within a range of 5° to 20°; and
the spare provisioning strategy includes disposing a spare spacecraft in a storage orbit, the storage orbit having a period of approximately one sidereal day, an inclination of less than 2°, a perigee altitude of at least 8000 km, and an eccentricity within a range of 0.4 to 0.66.

15. The method of claim 14, wherein the spare provisioning strategy further includes transferring the spare spacecraft from the storage orbit to one of the first operational orbit and the second operational orbit.

16. The method of claim 15, wherein transferring the spare spacecraft from the storage orbit to one of the first orbit and the second orbit includes providing a velocity increment ($\Delta V$) not greater than 1700 m/s.

17. The method of claim 14, wherein the constellation includes three or more spacecraft, including the first spacecraft disposed in the first operational orbit, the second spacecraft disposed in the second operational orbit, and a third spacecraft disposed in a third operational orbit.

18. The method of claim 17, wherein the spare provisioning strategy further includes transferring the spare spacecraft from the storage orbit to one of the first orbit, the second orbit and the third orbit.

19. The method of claim 18, wherein transferring the spare spacecraft from the storage orbit to one of the first orbit, the second orbit and the third orbit includes providing a velocity increment ($\Delta V$) not greater than 1700 m/s.

20. The method of claim 14, wherein the storage orbit has an initially established line of apses such that apogee is aligned in the direction of the vernal equinox.

\* \* \* \* \*